(12) United States Patent
DiBlasio et al.

(10) Patent No.: US 12,480,738 B2
(45) Date of Patent: *Nov. 25, 2025

(54) VALVE SYSTEM FOR AIR GUN

(71) Applicant: UMAREX USA, INC., Fort Smith, AR (US)

(72) Inventors: Alexander Robert DiBlasio, Jamison, PA (US); Ben Noji, Landenberg, PA (US); Ross James Jutras, Newark, DE (US); Stephen J. Hague, Newark, DE (US)

(73) Assignee: Umarex USA, Inc., Fort Smith, AK (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/291,961

(22) Filed: Mar. 4, 2019

(65) Prior Publication Data

US 2019/0219356 A1    Jul. 18, 2019

Related U.S. Application Data

(63) Continuation of application No. 15/866,240, filed on Jan. 9, 2018, now Pat. No. 11,009,313.

(60) Provisional application No. 62/445,170, filed on Jan. 11, 2017.

(51) Int. Cl.
| | |
|---|---|
| *F41B 11/723* | (2013.01) |
| *F16K 1/12* | (2006.01) |
| *F16K 31/383* | (2006.01) |
| *F16K 31/44* | (2006.01) |

(52) U.S. Cl.
CPC ............. *F41B 11/723* (2013.01); *F16K 1/12* (2013.01); *F16K 31/383* (2013.01); *F16K 31/44* (2013.01)

(58) Field of Classification Search
CPC ......... F41B 11/00; F41B 11/72; F41B 11/723; F41B 11/73; F16K 1/12; F16K 31/383; F16K 31/44
See application file for complete search history.

(56) References Cited

U.S. PATENT DOCUMENTS

| | | | | |
|---|---|---|---|---|
| 8,322,329 | B1* | 12/2012 | Sikes | F41B 11/723 |
| | | | | 124/73 |
| 8,485,172 | B2* | 7/2013 | Tseng | F41B 11/62 |
| | | | | 124/73 |
| 8,651,096 | B2* | 2/2014 | Sikes | F41B 11/723 |
| | | | | 124/73 |
| 9,033,306 | B2* | 5/2015 | Kunau | B60C 25/145 |
| | | | | 251/44 |
| 9,080,832 | B2* | 7/2015 | Brahler, II | F41B 11/723 |
| 9,605,924 | B1* | 3/2017 | McCaslin | F41B 11/62 |
| 10,598,461 | B2* | 3/2020 | Lort | F41B 11/73 |
| 2013/0104868 | A1* | 5/2013 | Sikes | F41B 11/723 |
| | | | | 124/77 |
| 2017/0299322 | A1* | 10/2017 | Lort | F17C 7/04 |

(Continued)

*Primary Examiner* — Benjamin P Lee
(74) *Attorney, Agent, or Firm* — Mark A. Pitchford; Eric B. Fugett; Pitchford Fugett, PLLC

(57) ABSTRACT

A valve system utilizes a main valve body with a restricted diameter conduit communicating between a propulsion chamber and rear cavity and a smaller venting valve mechanically actuated to open the rear cavity to atmosphere, thereby causing the main valve body to open to pass pressurized air in the propulsion chamber to an orifice to power a projectile. The orifice has a diameter at least as large as the diameter of the projectile.

7 Claims, 7 Drawing Sheets

(56) References Cited

U.S. PATENT DOCUMENTS

2018/0180377 A1\* 6/2018 Lort .................. F41B 11/62
2020/0025511 A1\* 1/2020 Cherry ............. F41B 11/723

\* cited by examiner

VALVE SYSTEM FOR AIR GUN

CROSS-REFERENCES TO RELATED APPLICATIONS

This application is a Continuation of and claims priority to U.S. patent application Ser. No. 15/866,240 filed Jan. 9, 2018 entitled "VALVE SYSTEM FOR AIR GUN" which claims priority to U.S. Provisional Patent Application Ser. No. 62/445,170 filed Jan. 11, 2017 entitled "VALVE SYSTEM FOR AIR GUN".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This invention relates to air rifles using compressed air to propel a projectile through a barrel. In even greater particularity, the present invention relates to a valve assembly that provides compressed air to an exit orifice behind the projectile to force the projectile through the barrel.

Prior art large caliber pneumatic launching devices (i.e., air rifles) are limited to a valve size smaller than a projectile diameter. In order to maximize power delivered, high air pressures (e.g., greater than 3 k psi) must be used to compensate for the flow restriction of the valve being smaller than the projectile and barrel bore diameters. These prior art air rifles need relatively high pressure valves to deliver relatively high pressure air to the barrel bore and the projectile. Consequently, large opening forces are required to open the valve and fire the projectile. These pressure constraints and other considerations such as the use of probes to chamber projectiles require that the main valves in these guns are kept smaller than the projectile and bore diameter. Our unique valve system allows for much smaller opening forces relative to the caliber of the round being fired while keeping pressure high at the projectile while the projectile traverses the barrel bore.

All known prior art air rifles use probes to chamber rounds. This means that the main valve diameter or final orifice has a diameter less than the diameter of the projectile and diameter of the bore.

BRIEF SUMMARY OF THE INVENTION

Aspects of the present invention provide an air gun and air gun main valve assembly using compressed air to propel a projectile through a barrel. More particularly, aspects of the present invention relate to a main valve system that matches the volume of air delivery to the orifice size (i.e., barrel bore and volume) while reducing the force necessary to actuate or trigger the valve assembly and launch the projectile.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states.

One or more of the above objects can be achieved, at least in part, by providing a valve system which delivers air in a capacity matching the possible flow out of the system without requiring the force to open a sealing face as large as the caliber of the projectile.

Figure 1:
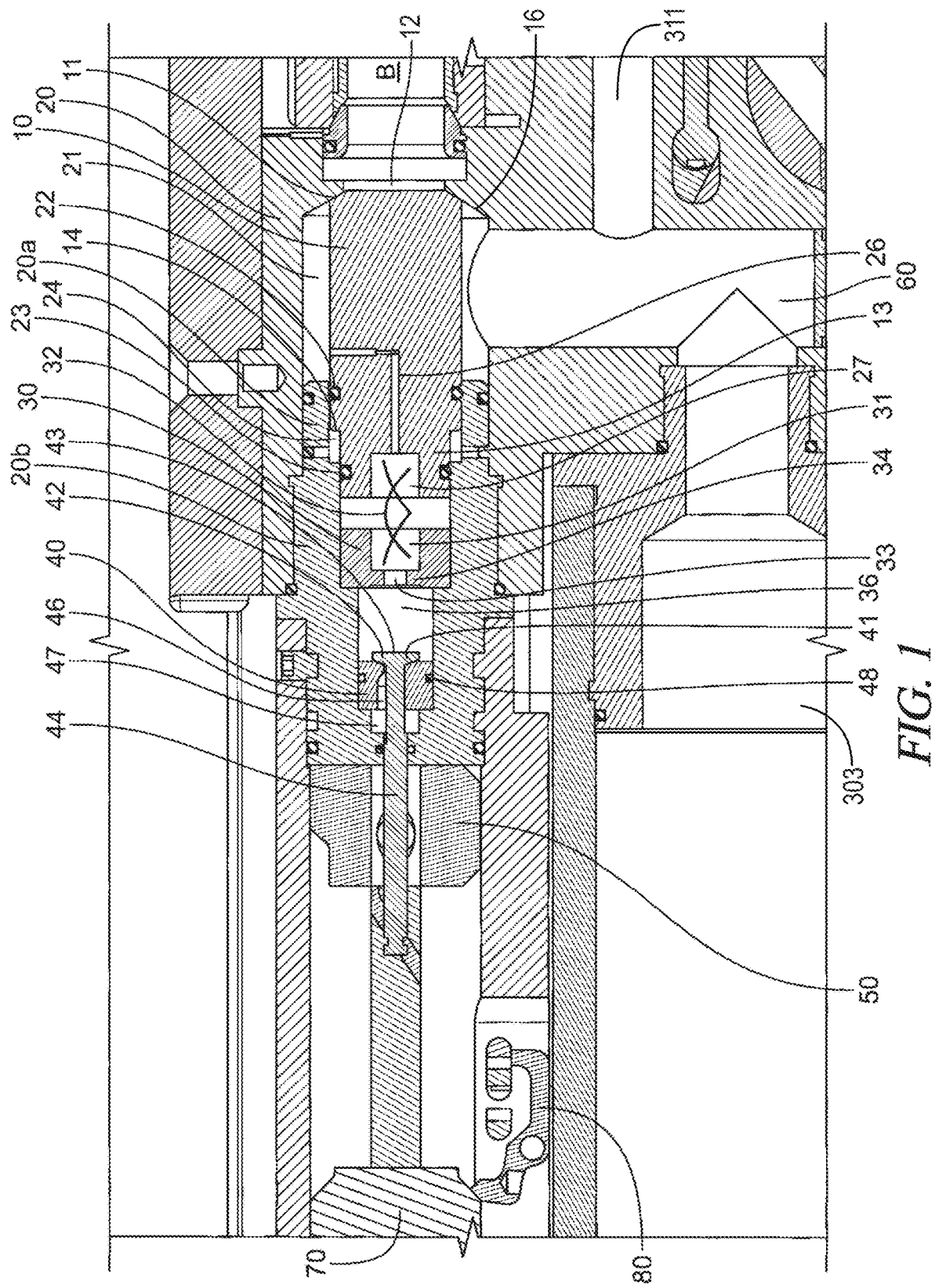
FIG. 1 shows the valve mechanism with all valves seated and closed.
Figure 2:
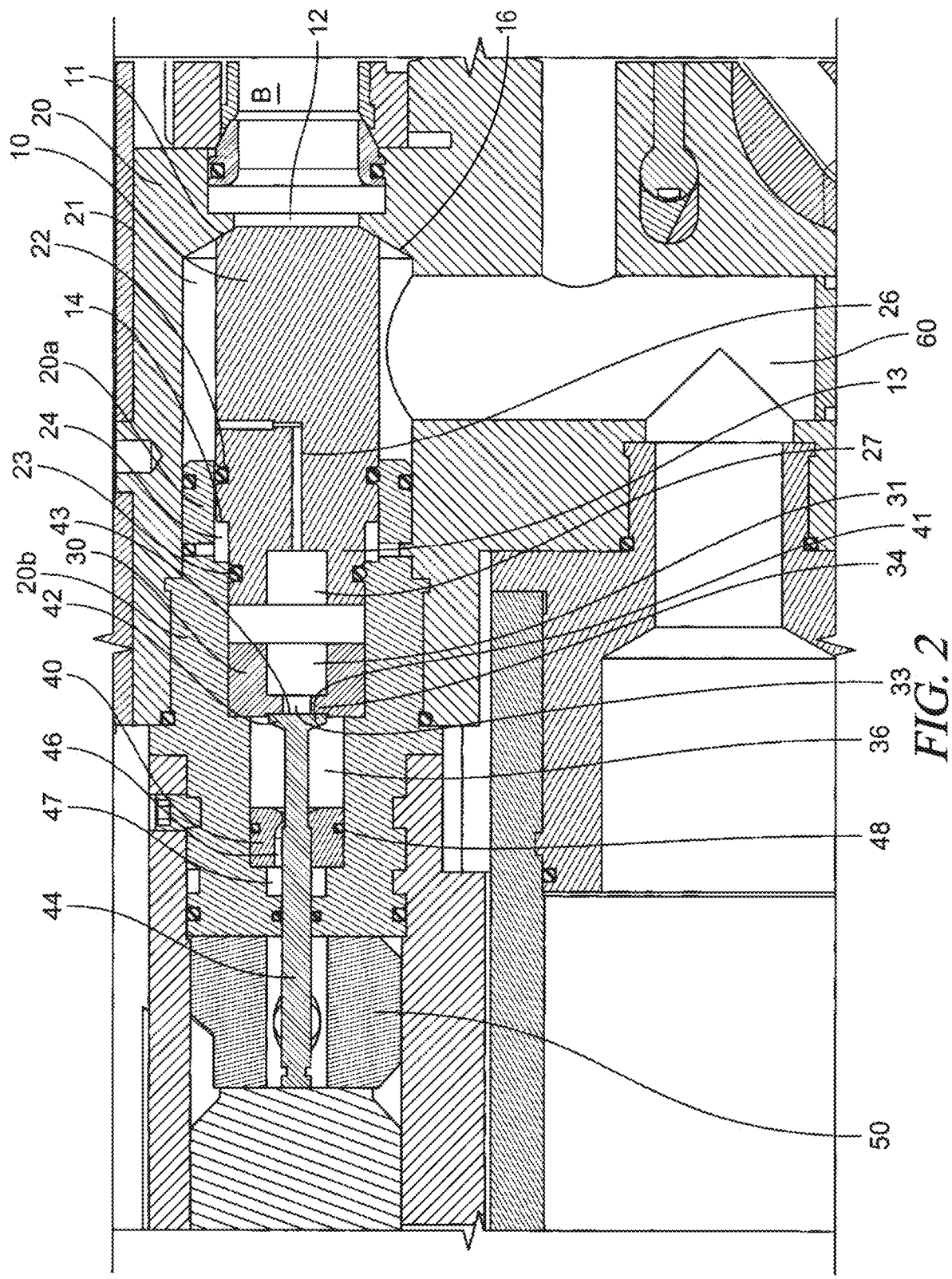
FIG. 2 shows the valve mechanism as the hammer is activated.
Figure 3:
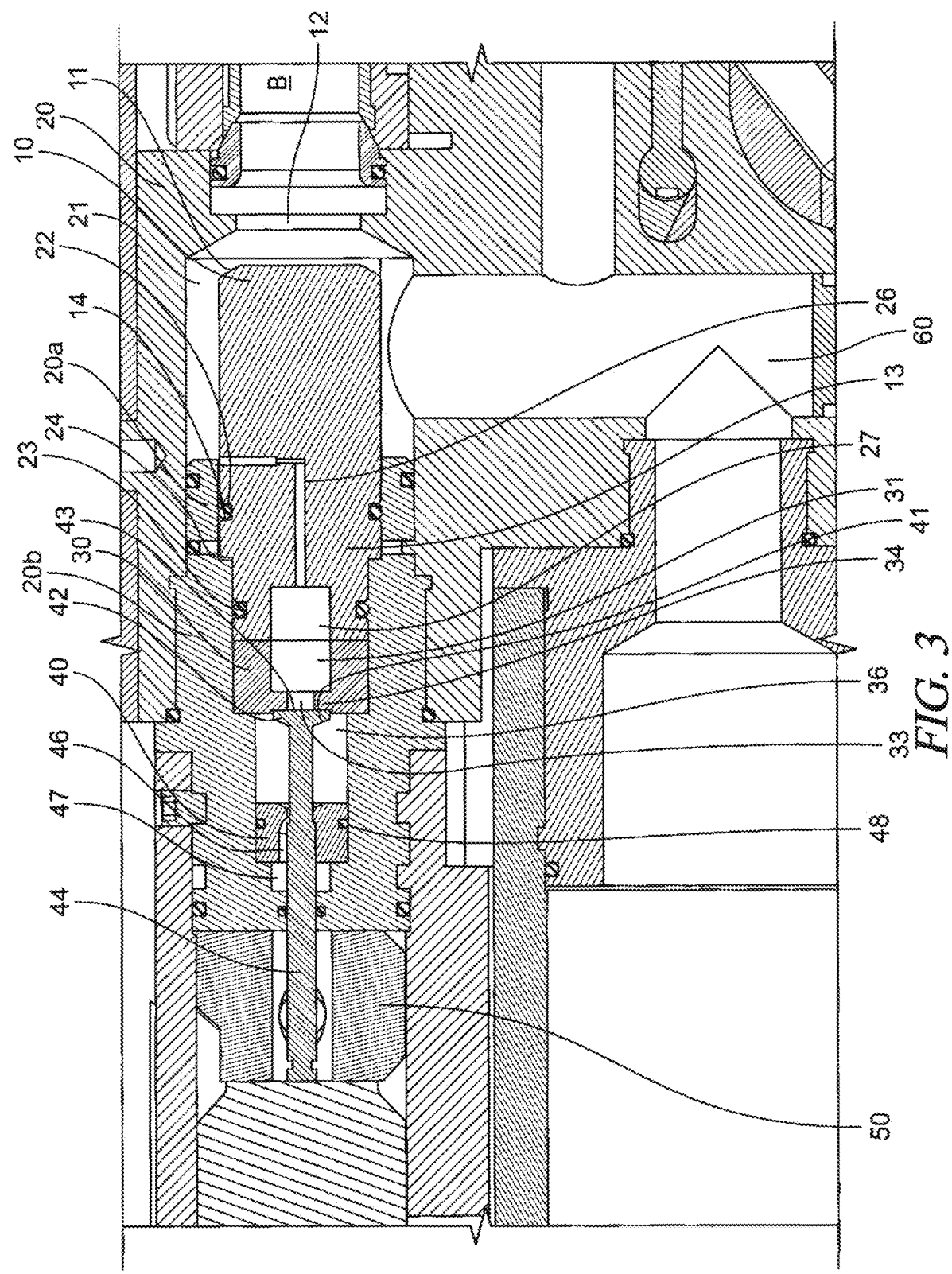
FIG. 3 shows the valve mechanism with the valves actuated by the hammer.
Figure 4:
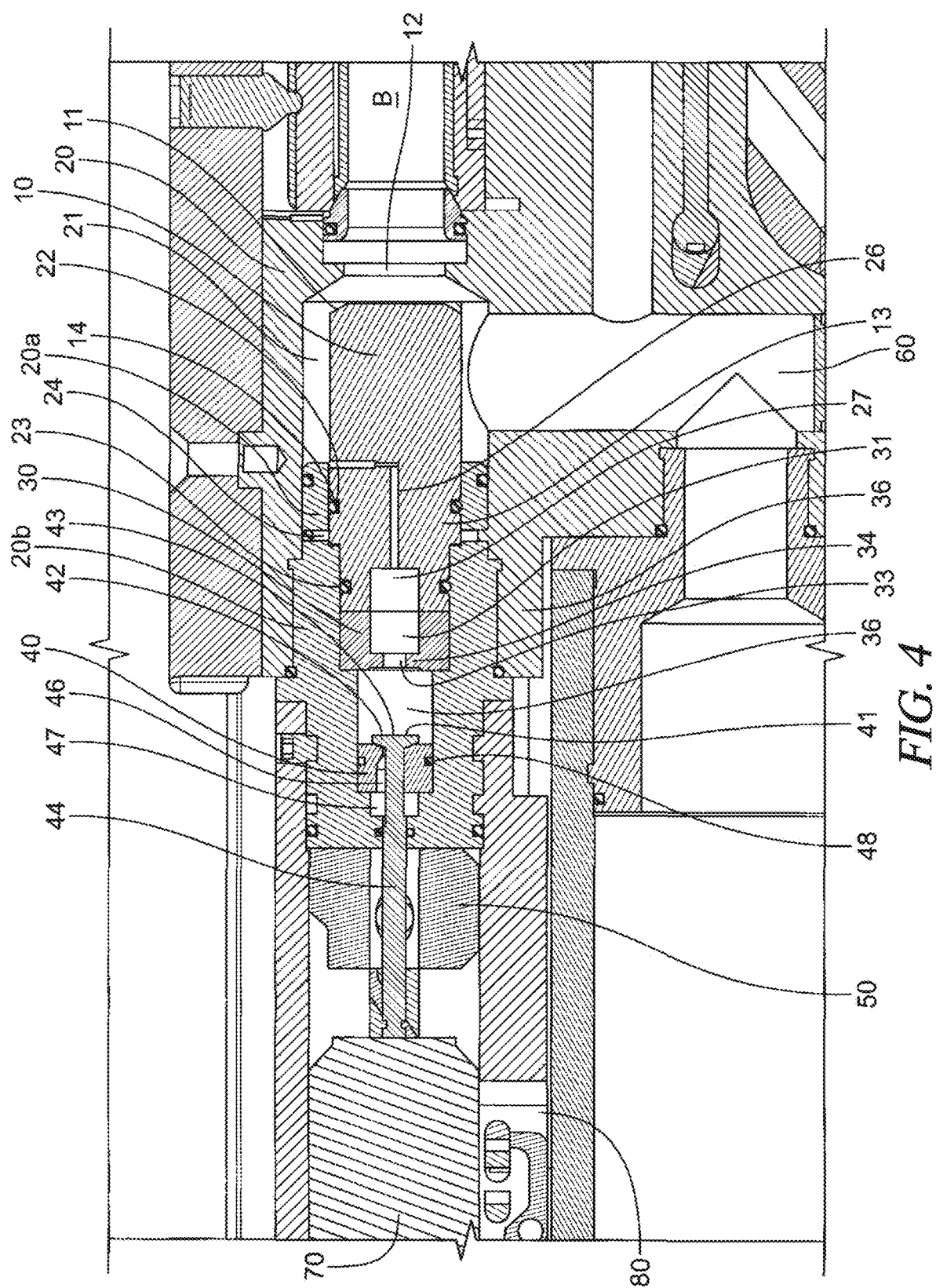
FIG. 4 shows the valve mechanism after firing.
Figure 5:
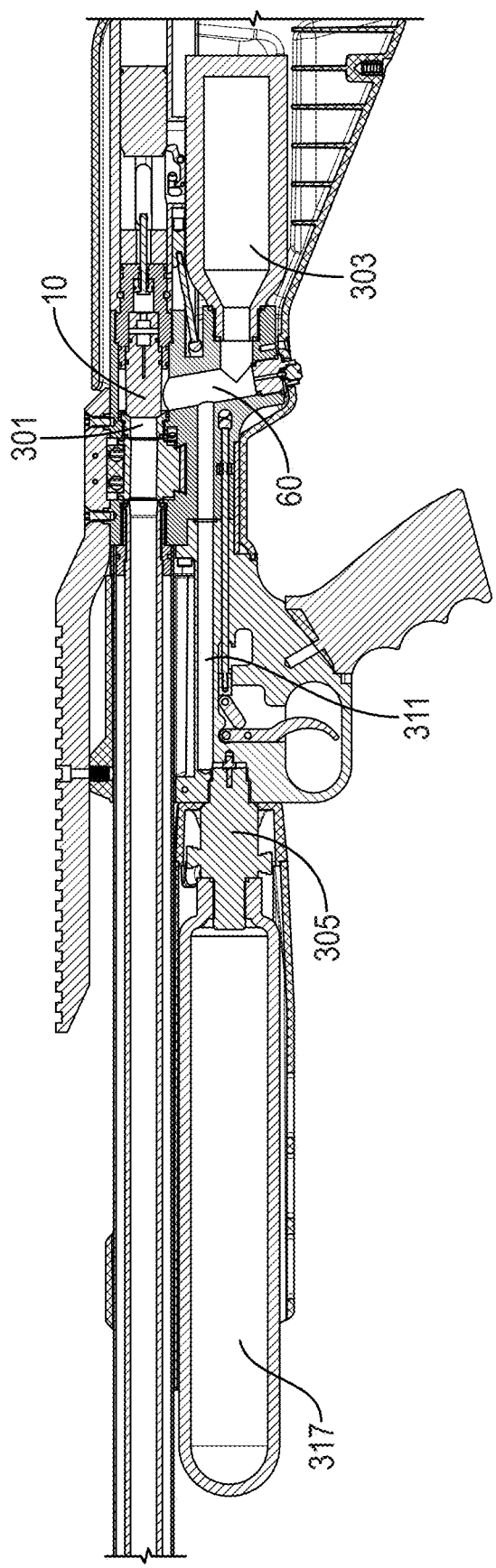
FIG. 5 shows the valve mechanism with all valves seated and closed using a main valve seat insert for the main valve seat.
Figure 6:
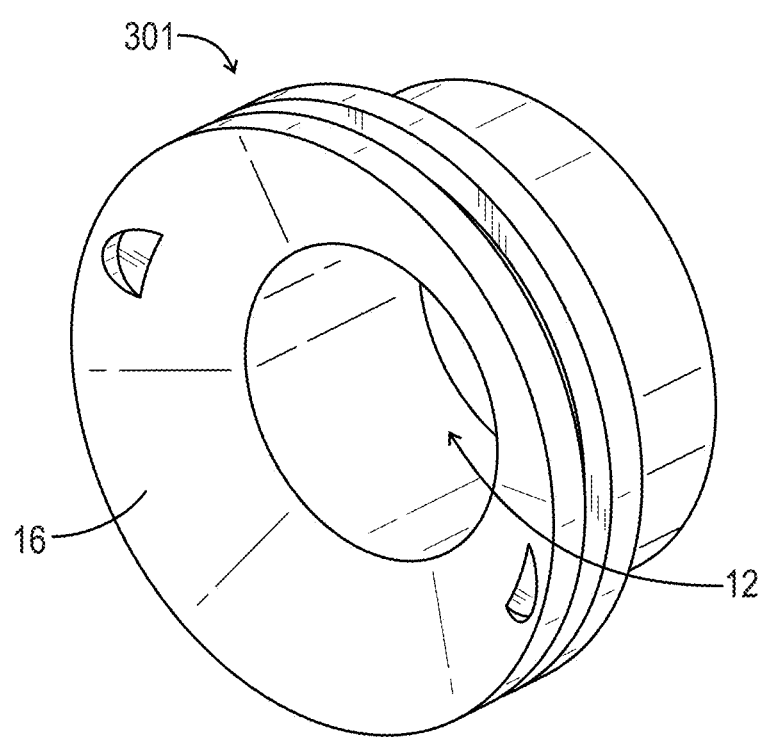
FIG. 6 shows an isometric view of the main valve seal insert of FIG. 5.
Figure 7:
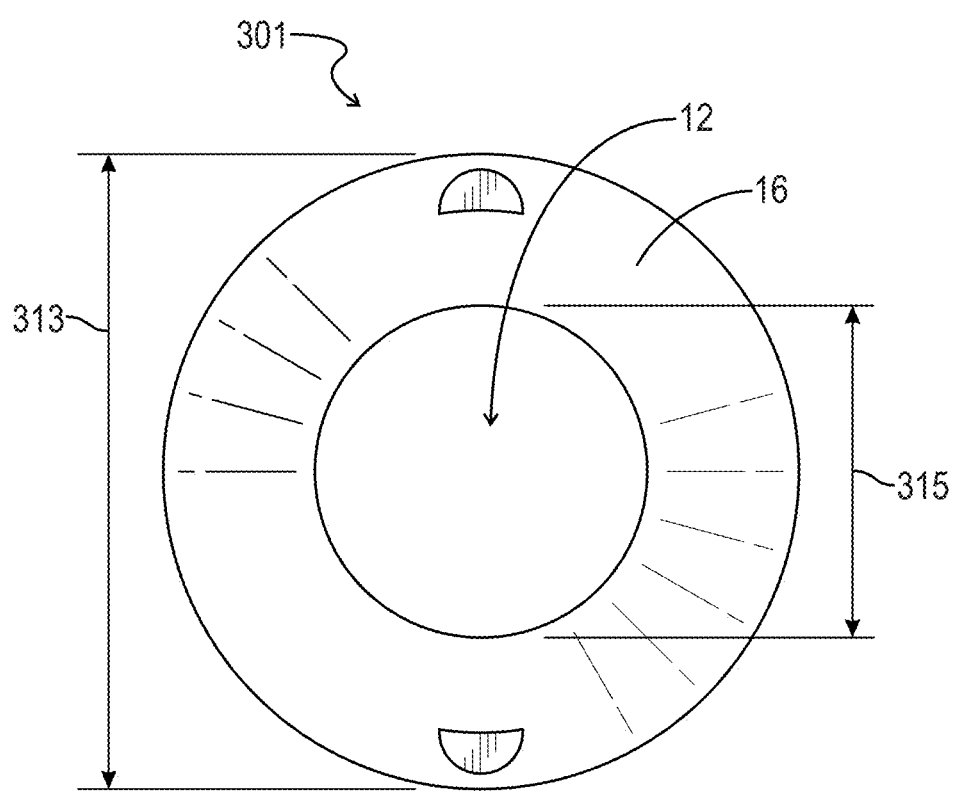
FIG. 7 shows a plan view of the main valve seat from the rear.

Referring to FIG. 1, note valve housing assembly 20 contains a cylindrical main valve body 10 which has an annular tapered front seal face 11 designed to be larger in diameter than that of the final orifice 12 of the system to the barrel B. Main valve body 10 is designed to open far enough (e.g., approximately ⅛") for the air supply from a high pressure source to be delivered faster than the air can be used for propulsion of the projectile. The main valve 10 is able to achieve its size without compromising the effort to open the valve due to the operation required to open the valve.

As noted in FIGS. 1 to 4, main valve body 10 is housed within a stepped cavity formed by housing assembly 20. At the forward end of the main valve body 10, housing assembly 20 has an inner diameter greater than the diameter of main valve body 10 thus forming a propulsion chamber 21 about the body. Cylindrical main valve body 10 is formed with a stepped rear portion 13 defining a shoulder 14. Cylindrical main valve body 10 carries a pair of O rings 22 and 23, with large O ring 22 carried forwardly of shoulder 14 and smaller O ring 23 carried rearwardly of the shoulder 14. The term O ring should be construed to include polymer based O rings made of any conventional material including rubber, silicone, or a blend thereof, as well as FEP encapsulated O rings, PTFE O rings, and flexible graphite O rings. Cylindrical main valve body 10 is slidably carried in a first reduced diameter portion 20a of housing assembly 20 and a second reduced diameter portion 20b of housing assembly 20. Large O-ring 22 carried by main valve body 10 sealingly engages the first reduced diameter portion of housing assembly 20 forwardly of shoulder 14 and a smaller O-ring 23 is mounted to main valve body 10 such that shoulder 14 is positioned in between O rings 22 and 23. Consequently, a variable sized chamber 24 is formed between the main valve body 10 and the housing assembly. This chamber is vented through the housing assembly 20 to the atmosphere and sealed from the propulsion chamber 21 as well as the rear of the main valve body 10. It will be appreciated that gases within this variable sized chamber 24 being vented to the atmosphere provides no resistance to axial movement of main valve body 10, thus allowing the body to move freely within the housing assembly 20.

It will also be seen that the main valve body 10 has a rearwardly opening spring well 27 formed in the rear face of the body. A biasing spring 32 is mounted in the rearwardly opening spring well 27 and urges the main valve body 10 toward the valve seat 16 formed about final orifice 12. Thus, in its normally biased position, valve seal face 11 will abut valve seat 16.

The main valve body 10 also has a restricted diameter conduit 26 extending from just forwardly of larger O ring 22 radially within main valve body 10 and then centrally to the rear of main valve body 10 terminating in the rearwardly opening spring well 27, thereby providing fluid communication between propulsion chamber 21 and rearwardly opening spring well 27. As will be seen hereinafter, this restricted conduit 26 gives the pressurized air the ability to be both the firing air and also be used to hold the valve closed in the normal operating conditions. The sizing of the restricted conduit 26 can be increased to decrease the open time of the main valve (body 10 and valve seat 16) or decreased to increase the open time or dwell time of the main valve (body 10 and valve seat 16). Additionally, the force of pressurized gas traveling from the pressurized gas chamber 60 into the area behind the main valve body 10 against a rear face of the main valve body 10 can hold the main valve body 10 against the main valve seat 16 without the use of any spring biasing the main valve body 10 toward the main valve seat 16. In one embodiment, the sizing (i.e., flow capability) of the restricted conduit 26 is adjusted such that the dwell time or open time of the main valve (i.e., main valve body 10 and main valve seat 16) corresponds to the time it takes the projectile to exit the muzzle of the barrel B. It should be appreciated that there may be small time delay between the time it takes a pressure change at the final orifice 12 to reach the back of the projectile (i.e., a pressure wave propagation time) when the projectile is at the muzzle of the barrel B. Therefore, it may be possible to close the main valve just before the projectile exists the muzzle while still maintaining near constant pressure at the back of the projectile as it exists the muzzle of the barrel B. Closing the main valve as soon as possible while maintaining near constant regulated pressure at the back of the projectile as it exits the muzzle of the barrel B provides maximum velocity to the projectile while minimizing pressurized gas usage thus maximizing the number of regulated pressure shots that a pre-charged pneumatic air rifle can provide without having to recharge the bulk air supply 317 of the air rifle. The radial portion of restricted conduit 26 is positioned such that it communicates with the propulsion chamber 21 when main valve body 10 is in its forwardly biased position with valve seal face 11 abutting valve seat 20a. Also mounted within the second reduced diameter portion of housing assembly 20 rearwardly of main valve body 10 is wall portion 30 which has formed there within forwardly opening cooperative spring well 31. It to be understood that a biasing spring 32 is mounted within rearwardly opening spring well 27 and cooperative spring well 31 to bias main valve body 10 toward a forward or closed position.

To retract main valve body 10 and fire the projectile, the present valve system uses a much smaller valve as well, called the vent valve, to vent a chamber of air behind the main valve in order to open the main valve as will be described hereinafter. A venting orifice 33 extends from cooperative spring well 31 rearwardly to a first venting chamber 36 such that cooperative spring well 31 communicates through venting orifice 33 to venting chamber 36 formed within a fourth reduced diameter portion of housing assembly 20 between wall portion 30 and venting valve component 40, also mounted within fourth reduced diameter portion 20 d of housing assembly 20. Valve component 40 has a valve seat 41 formed on its forward wall that mates with rear valve face 42 carried on poppet valve head 43 which is rearwardly spring biased such that the valve is normally closed at valve component 40. Poppet valve head 43 is carried on a valve stem 44 which extends through passage 46 in valve component 40. Venting chamber 36 communicates with an atmospherically vented chamber 47 vent via passage 46 when poppet valve head 43 is disengaged from valve seat 41. Venting valve seat component 40 carries an O ring 48 which seals between valve component 40 and the fourth reduced diameter portion of housing assembly 20.

Valve stem 44 is slidably carried by valve stem guide 50 mounted rearwardly of housing assembly 20 such that valve stem 44 extends rearwardly of valve stem guide 50 when the venting valve is biased in its normally closed position. Thus, it may be seen that with all of the valves in their normally biased or closed position propulsion chamber 21 communicates via restricted conduit 26 and venting orifice 33 with venting chamber 36. A pressurized gas supply 60 is connected to propulsion chamber 21, thus, with the valves in their normally closed position, propulsion chamber 2 land venting chamber 36 reach equilibrium with the pressure in each being the same and front seal face 11 is sealing urged against main valve seat 16 surrounding final orifice 12.

Mounted rearwardly of the valve stem guide 50 is a hammer 70 connected to a trigger mechanism 80 and biased toward impact with valve stem 44. When the trigger mechanism 80 is pulled, the hammer 70 moves forwardly and unseats the valve head 43 from valve seat 41, immediately venting the pressurized gas in venting chamber 36 to atmosphere and creating a large pressure differential across main valve body 10. Because restricted conduit 26 is much smaller than venting orifice 33 pressurized gas from the propulsion chamber 21 cannot fill the volume of the venting chamber 36 before the pressure differential across large O-ring 22 causes the valve body to move rearwardly, thereby opening final orifice 12 to allow the pressurized gas to propel the projectile. In other words, to open the venting valve, a mechanically actuated hammer 70 is used to strike the valve stem 44. Once the vent valve is open the air behind the main valve body 10 can be vented to atmosphere and the pressure and flow of the air in front of the main valve body 10 will force it to open all of the way and remain open until the vent valve has closed. This releases pressurized gas through the front orifice 12 and propels the pellet or other projectile through the barrel.

It will have been noted that in combination with the vent valve, the main valve utilizes three different sealing surfaces which gives the system the ability to close and open the main valve with much less force than a normal valve of this size would require; in addition to the three different sealing diameters, the main valve features a chamber 24 connected to atmosphere in the middle of the two O-rings 22 & 23. The atmospheric chamber 24 between the O-rings is essential to give the main valve the ability use any size of rearward chamber compared to any size of propulsion chamber. This feature makes this valve modular and we have disclosed a relationship that can be used for any caliber of pneumatic launching device if you scale the size of the valve according to the needs of the system. This valve system supplies a need that is crucial to the effectiveness of pneumatic launching devices. All known prior art large caliber pneumatic launching devices need to have a firing valve as big as the caliber of the round to be as effective as possible with respect to flow.

Energy transfer to the projectile from compressed gas is achieved when pressure on the rear face of the projectile remains constant or increases as the projectile traverses the barrel B. In firearms, increasing pressure as the projectile traverses the barrel is readily achieved because the burning powder (i.e., smokeless or black powder) supplies an increasing gas volume and pressure until after the projectile exits the barrel (assuming the cartridge has been loaded with an appropriate amount of powder). However, in air rifles, increasing pressure beyond the pressure of the reservoir supplying air to the projectile and barrel B is not possible. Thus, in air rifles, maintaining the pressure of the pressurized gas reservoir at the projectile (i.e., bullet) throughout the traversal of the projectile through the barrel is optimal. Aspects of the present invention include balancing a shot reservoir volume to barrel volume and shot reservoir diameter to barrel diameter in order to accomplish near static pressure at the projectile throughout its traversal of the barrel B upon firing of the air rifle.

Referring to FIGS. 1-7, in one embodiment, the final orifice 12 and main valve seat 16 are formed by a main valve seat insert 301. Thus, the main valve assembly of the air gun includes the valve seat 16 (formed by valve seat insert 301) and the main valve body 10. In operation, a regulator 305 supplies the pressurized air 60 from a bulk air supply 317. In one embodiment, the bulk air supply 317 is a 24 cubic inch tank holding air at 4500 psi when fully charged. The regulator 305 is set to 3000 psi. A tube 311 connects the regulator 305 to the pressurized gas supply 60, shot bottle 303, and propulsion chamber 21 about the main valve body 10. As described above, the air gun includes the main valve body 10 configured to interface with the face of the valve seat 16 to selectively provide pressurized air to the barrel B when the firing valve (i.e., vent valve formed by poppet 43 and vent valve seat 41) and main valve assembly (i.e., main valve body 10 and main valve seat 16) are triggered, fired, or actuated. In one embodiment, the main valve body 10 has an outer diameter of approximately 1" and the propulsion chamber 21 has a diameter of approximately 1.5" such that there is about ¼" of pressurized gas surrounding the main valve body 10 where it interfaces with the main valve seat 16.

A diameter of the final orifice 12 of the valve seat 16 is the internal diameter 315 of the valve seat 16. The barrel B has a bore diameter. In one embodiment, the internal diameter 315 of the valve seat 16 is at least as large as the bore diameter of the barrel B. In one embodiment, the internal diameter 315 of the valve seat 16 is larger than the bore diameter of the barrel B. In one embodiment, the internal diameter 315 of the main valve seat 16 is approximately 0.510" and the diameter of the bore is approximately 0.500". In one embodiment, the valve seat 16 has an external diameter 313 that is at least 1.5 times the bore diameter of the barrel B. In one embodiment, the external diameter 313 of the main valve seat 16 is approximately 0.971 inches in the bore barrel is approximately 0.500 inches such that the external diameter 313 of the valve seat 16 is approximately twice the bore diameter of the barrel B. In one embodiment, the main valve body 10 has an external diameter that is at least 1.5 times the bore diameter of the barrel B.

In one embodiment, the main valve assembly of the air gun includes a propulsion chamber 21 about the main valve body 10. The propulsion chamber 21, main valve seat 16, and barrel B form a propellant nozzle. That is, the propulsion chamber 21, external 313 and internal 315 diameters of the main valve seat 16, and slope of the main valve seat 16 cooperate to form a conduit of reducing diameter which works to accelerate air traveling through the conduit into the barrel B. In one embodiment, this propellant nozzle is a de Laval type nozzle.

In one embodiment, the barrel B has a volume, and a shot reservoir is configured to store pressurized gas and provide a pressurized gas supply. The main valve assembly is configured to provide pressurized gas from the shot reservoir to the barrel B when triggered. The shot reservoir has a total air volume at least 1.5 times the volume of the barrel B. In one embodiment, the volume of the barrel B excludes a volume of a linear chamber magazine containing the projectile. In one embodiment the shot bottle 303, and the shot bottle 303 has a volume of approximately 8 cubic inches. In one embodiment, the shot reservoir includes the propulsion chamber 21 surrounding the main valve body 10, the pressurized gas supply chamber 60, the shot bottle 303, and the tube 311 connecting the pressure regulator to the pressurized gas supply chamber 60 such that the total volume of the shot reservoir is the combined volume of the propulsion chamber 21, the pressurized gas supply chamber 60, the shot bottle 303, and the tube 311. In one embodiment, the volume of the barrel B is approximately 5.69 cubic inches, and the volume of the shot reservoir is approximately 9.52 cubic inches such that the volume of the shot reservoir is approximately double the volume of the barrel B.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful VALVE SYSTEM FOR AIR GUN it is not intended that such references be construed as limitations upon the scope of this invention except as set forth in the following claims.

What is claimed is:

1. An air gun comprising:
   a barrel having a volume;
   a bulk air supply configured to store pressurized gas;
   a shot reservoir configured to store pressurized gas and provide a pressurized gas supply;
   a pressure regulator configured to provide the pressurized gas supply to the shot reservoir at a predetermined pressure from the bulk air supply, wherein said predetermined pressure is less than a pressure of the bulk air supply;
   a valve assembly configured to provide pressurized gas from the shot reservoir to the barrel when triggered, wherein:
   the valve assembly is the main valve assembly of the air gun; and
   the shot reservoir has a total air volume from a main valve seat of the valve assembly to the regulator of at least 1.5 times the volume of the barrel.

2. The air gun of claim 1, wherein the shot reservoir comprises a propulsion chamber surrounding the main valve body, a pressurized gas supply chamber, a shot bottle, and a tube connecting a pressure regulator to the pressurized gas supply chamber such that the total volume of the shot reservoir is the combined volume of the propulsion chamber, pressurized gas supply chamber, shot bottle, and the tube.

3. The air gun of claim 1, wherein the shot reservoir comprises a shot bottle, and the shot bottle has a volume of approximately 8 cubic inches.

4. The air gun of claim 1, wherein the volume of the barrel is approximately 5.69 cubic inches, and the volume of the shot reservoir is approximately 9.52 cubic inches.

5. The air gun of claim 1, wherein the valve assembly comprises:
   a valve seat having an external diameter larger than a bore diameter of the barrel.

6. The air gun of claim 1, wherein the valve assembly comprises:
   a valve seat having an external diameter at least 1.5 times the bore diameter of the barrel.

7. The air gun of claim 1, wherein the valve assembly further comprises:
   a valve seat; and
   a main valve body configured to interface with the valve seat to selectively provide pressurized gas to the barrel when triggered, wherein the main valve body has an external diameter larger than a bore diameter of the barrel, and the external diameter of the main valve body is at least 1.5 times the bore diameter of the barrel.

* * * * *